US006226770B1

(12) United States Patent
Barchan

(10) Patent No.: US 6,226,770 B1
(45) Date of Patent: May 1, 2001

(54) METHOD OF PROVIDING AN OPTICAL DATA CARRIER WITH IDENTITY INFORMATION

(75) Inventor: Jan Barchan, Malmo (SE)

(73) Assignee: Ifunga Test Equipment B.V., De Cocksdorp (NL)

( * ) Notice: Subject to any disclaimer, the term of this patent is extended or adjusted under 35 U.S.C. 154(b) by 0 days.

(21) Appl. No.: 09/214,632

(22) PCT Filed: Jun. 3, 1997

(86) PCT No.: PCT/SE97/00957

§ 371 Date: Jan. 4, 1999

§ 102(e) Date: Jan. 4, 1999

(87) PCT Pub. No.: WO98/01852

PCT Pub. Date: Jan. 15, 1998

(30) Foreign Application Priority Data

Jul. 5, 1996 (SE) .................................................. 9602656
Oct. 5, 1996 (SE) .................................................. 9603763

(51) Int. Cl.[7] .................................................. G11B 20/18
(52) U.S. Cl. .............................. 714/756; 369/47; 369/53; 714/811
(58) Field of Search .................................... 714/756, 811; 369/53, 54, 50, 48, 47

(56) References Cited

U.S. PATENT DOCUMENTS 5,371,750 * 12/1994 Inoue et al. ........................ 371/37.4
5,513,260   4/1996 Ryan ........................................ 380/3
5,608,717 *  3/1997 Ito et al. .............................. 369/275.1
5,828,754 * 10/1998 Hogan ..................................... 380/49
5,996,111 * 11/1999 Yoshida et al. ...................... 371/37.4

FOREIGN PATENT DOCUMENTS

0545472A1   6/1993  (EP) .
0637023A1   2/1995  (EP) .
0703576A1   3/1996  (EP) .

* cited by examiner

*Primary Examiner*—Stephen M. Baker
(74) *Attorney, Agent, or Firm*—Gray Cary Ware & Freidenrich LLP

(57) ABSTRACT

When manufactured, an optical data carrier is provided with digital information, which is written and stored in accordance with at least one previously defined encoding method for error correction and which may be read and decoded at a later stage by means of an optical reader with correction of errors in accordance with said encoding method. A predetermined number of logical symbols or bits are selected at predetermined positions in the digital information to be stored on the data carrier. A set of logical errors are intentionally created by replacing the selected symbols with corresponding symbols in a predetermined code sequence representing the identity of the data carrier. The logical errors are of such a type as to be normally corrected by the optical reader, when the data carrier is read and/or copied. The presence of at least a subset of the set of logical errors during reading without error correction of at least part of the digital information on the disc is interpreted as evidence of the data carrier having an identity determined by the set of logical errors.

6 Claims, No Drawings

METHOD OF PROVIDING AN OPTICAL DATA CARRIER WITH IDENTITY INFORMATION

TECHNICAL FIELD

The present invention relates to a method of providing an optical data carrier with identity information, said data carrier when manufactured being provided with digital information, which is written and stored according to at least one previously defined encoding method for error correction and which may be read and decoded at a later stage by means of an optical reader with correction of errors in accordance with said encoding method.

DESCRIPTION OF THE PRIOR ART

Compact discs (CD) are a common type of optical data carriers according to the above. Compact discs are provided in various forms, such as CD-Audio (containing for instance music), CD-ROM (secondary computer read-only memory), CD-I (interactive CD), and Photo-CD (containing digital photographs). In the context of this document the term compact disc will be used in a broader sense relating to any kind of optical compact discs—also such types not explicitly specified in this document. In particular, it should be understood that the discussion in this document is applicable also to the high density compact disc standard called DVD (Digital Video Disc), which was recently introduced by Toshiba, Japan.

Compact disc applications are today taken for granted in our daily lives. We listen to music on compact discs at home as well as in our cars. When working with computers we often use information stored on CD-ROM. An increasing number of commercial software products are nowadays available on CD-ROM, such as utility programs (e.g. word processors and spread-sheat programs) or entertainment programs (e.g. computer games). Some of us choose to store our vacation pictures on Photo-CD rather than keeping our pictures as paper-printed photographs or slide photographs.

As a consequence of the use of compact discs having become increasingly popular, it has become desirable to provide compact discs with identity marking. It may for instance be convenient to provide a compact disc with information regarding, e.g., manufacturer, author, article number, etc. Another example is preventing the production of illegal copies, considering that is has become increasingly attractive to less scrupulous individuals to copy and plagiarize commercially available compact discs products, CD-Audio and CD-ROM in particular. In certain parts of the world a complete industry has been developed to mass-produce illegal copies of copyright-protected compact disc products and to sell these illegal copies to prospective buyers. Since the legitimate author or owner of the property will get no compensation for his work and his costs, there is a risk of a cultural as well as a technical impoverishment, should the illegal copying and plagiarizing be permitted to continue its explosive growth.

EP-A-0 637 023 discloses a method of protecting an optical data carrier, such as an optical disc, from illegal copying by providing it with a plurality of irregular storage pits, which are automatically corrected during normal copying and which, as a consequence, will not be copied onto the disc copy. The irregular pits have a physical shape deviating from a perfect or normal shape. Furthermore, the irregular pits are arranged in an irregular sequence, which generates a tracking error signal indicative of the presence of the irregular pits. In addition, the irregular pits may be detected by the deviations in symmetry for the analog HF-signal waveform. By scanning the disc for such irregular pits, it is possible to determine whether the disc is a legal and original disc (containing said irregular pits), or an illegal copy (lacking said irregular pits).

U.S. Pat. No. 5,513,260 relates to a similar method and apparatus for protecting various recording media. An authenticating signature is recorded on the media by radially position modulating the writing head or varying the specific data blocks.

A drawback of a copy-protection principle according to EP-A-0 637 023 is that additional hardware or equipment is required for creating the physical irregularities in the storage layer of the disc. Furthermore, since these irregularities are of a physical nature (i.e., the physical shape or arrangement of the irregular pits is different from that of a normal pit), an infringer or plagiarist may be capable of locating those positions on the disc, in which the copy-protecting information (the irregular pits) are located, whereupon the irregularities thus located may be transferred to, or recreated on, the disc copy.

SUMMARY OF THE INVENTION

It is an object of the present invention to provide an improved identity marking for an optical data carrier in such a way, that only authorized users are able to read identity information stored on the data carrier, while said identity information will be hidden from and unavailable to all other users. One embodiment of the invention aims at rendering it possible to determine the authenticity of an optical data carrier, such as a compact disc, in order to be able to decide, whether a certain disc has been produced by the rightful manufacturer, or by an unauthorized person or manufacturer.

Such an improved identity marking principle, which does not suffer from the disadvantages described above, may be obtained by providing the data carrier with intentionally arranged errors on a logical level (bit or symbol errors, e.g. errors among the digital ones and zeroes stored on the disc), rather than a physical level.

Thus, the object is achieved by a method with features according to the characterizing part of the appended independent patent claims. Preferred alternatives to the method according to the invention are specified in the dependent claims.

DETAILED DESCRIPTION OF THE INVENTION

The digital information on a compact disc is stored as pits and plane areas (so-called lands) in a layer of plastic or the like. The pits and the plane areas represent the binary symbols "one" and "zero", respectively, in the digital information. The contents of the compact disc are read by means of a laser beam passing through the information layer of plastic or the like and reflecting in a reflective layer of metal or the like. The reflected laser light is converted by a photo detector into an electrical signal, which is digitalized.

Since the compact disc is storing large amounts of information on a small surface (a conventional compact disc is capable of storing approximately 650 MB of information, which is equal to more than five billions of binary ones and zeroes), extensive measures have been taken to minimize the risk of read errors due to irregularities in the disc, scratches, grease stains, signal noise, etc. When the standard for the compact discs of today was established during the seventies (see for instance Philips "Red Book", "Yellow Book", Green Book", and "Orange Book"), it was decided to use error-correcting block encoding for the digital information on the compact disc.

Reed-Solomon-type block codes are used for compact discs. If an uncoded data sequence contains K symbols and an encoded data sequence contains N symbols after encoding, then K symbols in the code sequence may be regarded as information symbols, while the remaining N–K symbols in the sequence are parity symbols. These parity symbols add redundancy to the encoded information, and thanks to this redundancy symbol errors may be detected and corrected, respectively. For a block code to be able to correct all error patterns e with a certain so-called Hamming-weight $w_H(e)$, where $w_H(e)$ is equal to the number of symbols≠0, it is a general fact that the number of parity symbols must fulfil the condition $N-K > w_H(e) - 1$.

Reed-Solomon block codes are described in for instance "Fundamental of Convolutional Codes", R. Johannesson and K. Zigangirov, The Institution of Information Theory, Lund Institute of Technology, 1992, or in "Bit-serial Reed-Solomon Encoders", E. R. Berlekamp, IEEE Trans. Inform. Theory, IT-28:869-874 (1982), and hence these codes are not described in more detail now.

The compact disc information is encoded in two levels (an outer code C1 and an inner code C2, respectively). When reading the information, the information is correspondingly decoded in two steps by letting read data pass through a first and a second decoder. Each of the decoders is able to correct double-symbol errors, and thanks to the two-dimensional code arrangement a compact disc reader is able to correct also rather serious read errors.

To copy a compact disc the following usually takes place. The information on the original disc is read by a compact disc reader and decoded in two levels according to the above. The decoded digital information is then fed to a writing device for recordable compact discs (CD-WORM; "Write Once Read Many"), where the information is encoded in two levels before it is stored on the copy disc.

According to the invention an optical data carrier, such as a compact disc, is provided with identity information by intentionally providing the disc during the manufacturing process with logical errors, i.e. bit or symbol errors in the digital information stored on the disc, according to a predetermined pattern. The errors are only as severe as what may be corrected by the decoders of a compact disc reader, meaning that a consumer will virtually never notice or be disturbed by the fact that the disc has been intentionally provided with said errors. If the disc is illegally copied according to what has been described above, the compact disc reader used in the copying process will correct the intentionally arranged errors, before the copied information is stored on the copy disc. Hence, an illegal copy will not be provided with the identity-indicating errors of the original disc.

A preferred form of the method according to the invention will now be described. Before the manufacturing of the compact disc—or rather before the manufacturing of the template (so-called stamper) used for the printing of the compact discs—some bits or symbols are selected among the encoded digital information to be stored on the disc. These bits, which are preferably not located adjacently on the disc but are rather distributed throughout the entire disc or parts of the disc, are then replaced bit by bit by the corresponding bit in a code word representing the identity of the disc. For instance, assume that the original bits (which have been selected in a certain way according to what will be described below) may be represented by:

11010011 and that the code word may be represented by:

01110001.

Thus, in the example above, where only 8 bits are used for simplicity reasons—a lot more bits are used in practice the code word "01110001" is written bit by bit at preselected positions in the digital information on the disc. Due to the fact that the code word is different from the original information, an error pattern is achieved, which is equal to the bit-wise difference between the original information and the code word.

The information, which according to the above has been modified to contain the intentional error pattern, is stored on every legally manufactured copy of the compact disc in question. Since the errors are not placed adjacently but rather in a distributed way according to the predetermined pattern, the errors will be corrected when the contents of the disc are read during normal play-back. The bit errors will be corrected automatically also when the information on the original disc is read in order to be transferred to illegal copies. Hence, these copies will not comprise the intentional bit errors of the original disc.

The number of bits as well as their positions on the disc may be chosen in many different ways. Preferably, however, the bits are chosen according to a predetermined keycode available only to authorized persons or companies, e.g. the manufacturer or the copyright proprietor. This keycode may for instance indicate to use every n:th bit position, where n=1, 2, ... m, thereby giving a code word of n·m bits. As an alternative more advanced keycodes may be used, stating for instance that bits number 13, 893, 12415, 23880, etc. are to be used. The number of possible keycodes are more or less infinite. It shall be noted that it is impossible for anybody without knowledge of the keycode to decide which bits among the several billion bits on a compact disc that constitute the identifying error pattern.

For increased security and reliability the error pattern may be repeated at several locations on the disc. Furthermore, the distributed code word may in itself be encoded according to an error correcting code, thereby ensuring a correct identification even if errors should occur during the reading of individual bits. In reality, is is impossible to avoid occasional errors during the reading of the digital information on a data carrier—and indeed, this is the reason for using error-correcting encoding methods. Obviously, errors may occur also when reading the particular bits representing the identity-indicating code word/error pattern. However, provided that the code word is chosen long enough, i.e. containing a large number of bits, such read errors have no impact on a secure and reliable identification. For instance, if two of the bits in a code word of 10,000 bits would be read erroneously (corresponding to an error rate of $210^{-4}$), 9,998 correctly read bits anyhow remain that indicate the correct identity information of the data carrier, provided that they match the corresponding bits in the predetermined code word.

The identity information provided on every legally manufactured data carrier may indicate the manufacturer, site or machine being used for the production of the data carrier (or alternatively record company, software company, etc). Consequently, every compact disc manufacturer may be given an identity represented by an error pattern being unique for the manufacturer. The stamper used when manufacturing the compact discs is provided with the unique error pattern, and consequently all discs manufactured by means of the stamper will contain the error pattern. Hence, manufacturer A may for instance be assigned the error pattern A', whereas manufacturer B may be assigned error pattern B', and so on. It will then be possible to determine not only the authenticity of any given compact disc but also its origin.

To be able to check the authenticity of the disc and to determine its identity according to the above it is obviously necessary to read the disc on a low level basis by means of equipment capable of reading individual bits at given positions on the disc without carrying out any normal error correction. It is believed to be within the qualifications of a man skilled in the art to design such an apparatus by means of previously known standard components, such as precision lasers and high-sensitive photodetectors.

Within the scope of the invention, as defined in the appended patent claims, the method according to the invention may be performed in alternative ways not described above, which is readily realized by a man skilled in the art. In particular it is noticed that the logical error patterns may be done in various different ways, as long as they are corrected during normal play-back or reading of the compact disc, and on condition that they may still be detected when the disc is examined on a low level basis according to the above.

What is claimed is:

1. A method of providing an optical data carrier with identity information, said data carrier when manufactured being provided with digital information, which is written and stored according to at least one previously defined encoding method for error correction and which may be read and decoded at a later stage by means of an optical reader with correction of errors in accordance with said encoding method, and said data carrier being intentionally provided with a set of identity-representing errors or irregularities, which are normally corrected by said optical reader during reading and/or copying of the data carrier, characterized by the steps of:

a) prior to the manufacturing of the data carrier selecting a predetermined number of logical symbols or bits at predetermined positions in the digital information to be stored on the data carrier, and b) creating said set of identity-representing errors on a logical level by replacing the selected symbols with corresponding symbols in a predetermined code sequence representing the identity of the data carrier, and storing the digital information thus modified on the data carrier, wherein the presence of at least a subset of said set of logical errors during reading without error correction of at least a part of the digital information on the disc is interpreted as an evidence of said data carrier having an identity determined by said set of logical errors.

2. A method according to claim 1, characterized in that the lack of said set of errors during reading without error correction is interpreted as an evidence of said data carrier being an illegally manufactured copy.

3. A method according to claim 1 or 2, characterized in that said error correcting encoding method is constituted by Reed-Solomon block encoding.

4. A method according to any preceding claim, characterized in that the optical data carrier is a compact disc (CD).

5. A method according to any preceding claim, characterized in that the optical data carrier is a compact disc of the type called DVD (Digital Video Disc).

6. A method according to any preceding claim, characterized by the additional step of:

c) checking the authenticity of the data carrier by reading the information contents of the data carrier at said predetermined symbol positions without error correction, putting together the symbols read from the data carrier, comparing these symbols with said predetermined code sequence, and stating that the data carrier is authentic,. if a correspondence exists between all symbols or a majority thereof.

* * * * *